Aug. 7, 1945.     T. O. LILLQUIST     2,381,827
GENERATING ELECTRIC DRIVE AND CONTROL SYSTEM
Filed Jan. 22, 1943
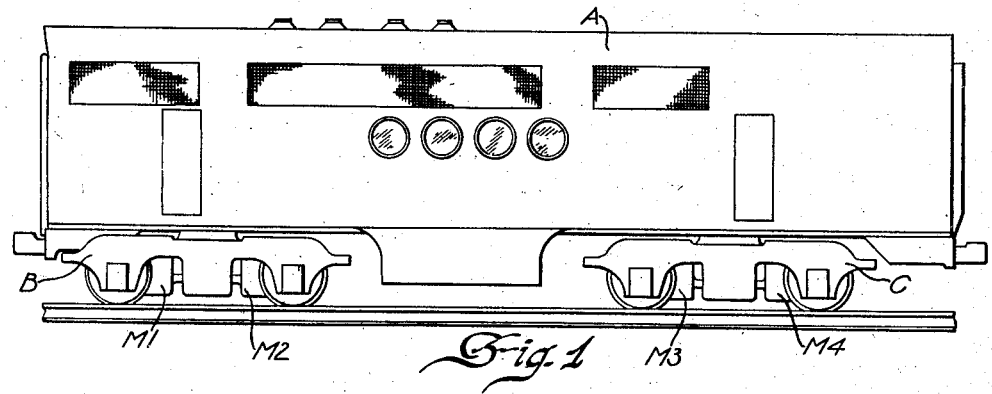
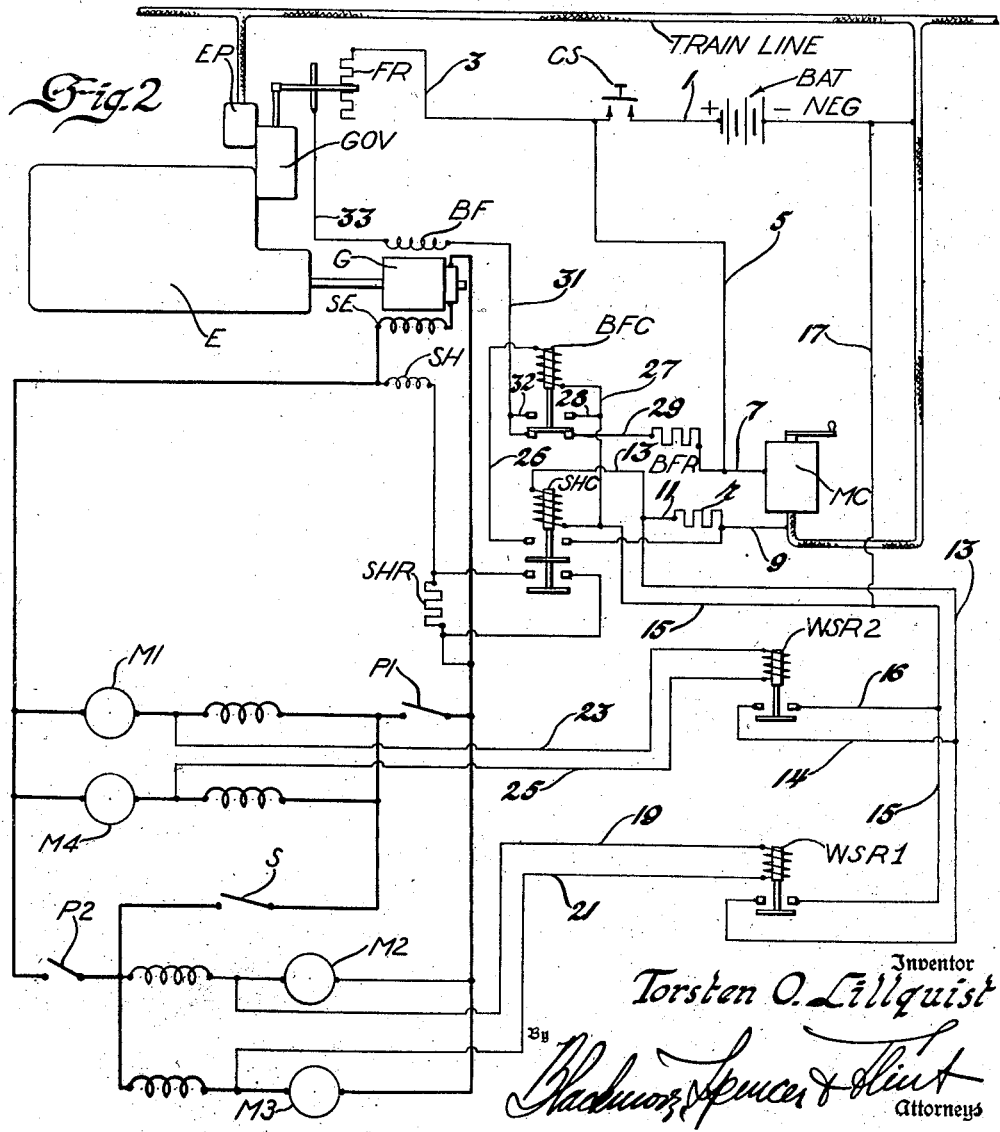
Inventor
Torsten O. Lillquist
By Blackmore, Spencer & Flint
Attorneys Patented Aug. 7, 1945

2,381,827

UNITED STATES PATENT OFFICE 2,381,827

GENERATING ELECTRIC DRIVE AND CONTROL SYSTEM

Torsten O. Lillquist, Clarendon Hills, Ill., assignor to General Motors Corporation, Detroit, Mich., a corporation of Delaware Application January 22, 1943, Serial No. 473,174

6 Claims. (Cl. 105—35)

The present invention generally relates to generating electric traction and control systems and more particularly to such systems for use on locomotives which are provided with a plurality of driving axles each of which is driven by a separate traction motor.

It is well known that when starting locomotives of the above type the load will be transferred from the front to the rear axles and the wheels on the forward axle will slip first. As each axle is generally driven by a series type traction motor, the speed of which varies inversely with the load, the speed of the motor might be suddenly increased to a dangerous value by slippage of the wheels driven thereby unless the power input to the motor is decreased promptly.

It has been found by tests on locomotives of the above type used in various types of service and under variable operating conditions that by providing suitable traction motor connections between groups of motors, wheel slippage is inhibited and by providing control means which acts automatically and instantaneously to materially reduce the power supplied to the motors in response to slight slippage of the wheels driven by any one motor, wheel slippage can be checked before damage to the wheels and motors occurs. The provision of a simple system for accomplishing the above results constitutes the principal object of this invention.

The above object and others will become apparent from the following detailed description taken in connection with the accompanying drawing, in which:

Figure 1 is a vertical elevation of a generating electric locomotive showing one form of driving wheel and axle arrangement for which the present invention is particularly adapted; however, it will become apparent that the invention is likewise adaptable to other types of driving wheel and axle arrangement, and Figure 2 is a diagrammatic view of the generating electric drive and control arrangement for the locomotive shown in Figure 1.

Referring to Figure 1, the locomotive is provided with a cab or superstructure A enclosing a generating electric power plant and control equipment to be subsequently described and shown in Figure 2. The cab A is supported on two four-wheel two-axle trucks of conventional type positioned equal distances either side of the center of gravity of the locomotive so that equal loads are imposed on each axle when the locomotive is stopped. Each axle is driven by a separate traction motor in conventional manner; the motors are indicated at M1, M2, M3, and M4 and the draw bar is applied to the superstructure above the trucks, as shown. With the above described arrangement, when the locomotive is coupled to a train and is started in either direction, the load on the forward or first driving axle is reduced the maximum amount, the load on the next forward or second axle is reduced a lesser amount, the load on the next or third axle is increased an amount equal to the decrease in load on the second axle and the load on the fourth or rear axle is increased an amount equal to the maximum decrease in load on the forward or first axle. In other words, the closer the axle is with reference to the front end of the vehicle, the lighter the load thereon and therefore the greater the tendency for the wheels on this axle to slip on the rail.

The power connections by which the motors M1, M2, M3, and M4 are supplied with power from the locomotive power plant in a suitable manner to inhibit overspeeding of any motor and also the control means and connections for instantly checking overspeeding of any motor are shown in Figure 2. The motors M1, M2, M3, and M4 are shown as the series type, and are connected in a power circuit, shown in heavy lines. The motors M1 and M4 are shown permanently connected in parallel and the motors M2 and M3 are likewise permanently connected in parallel. Each pair of parallel connected motors will accordingly have the same voltage applied thereto and therefore the current will divide equally between the motors which tends to make them operate at the same speed and torque, and thereby overspeeding of one motor of a pair is inhibited. As the parallel connected pair of motors M1 and M4 drive respective axles on which the greatest difference in load occurs, and as the parallel connected pair of motors M2 and M3 drive respective axles between which a lesser difference in weight occurs when the locomotive is started, the tendency of the wheels of the more lightly loaded axle to slip is inhibited by reason of these parallel motor connections.

Power is supplied to the power circuit and motors from the locomotive generating electric power plant comprising a compression igniting engine E and an electric generator G driven thereby of the compound type and electrically connected across the power circuit. Switching means are also connected in the power circuit whereby the pairs of parallel connected motors may be connected in series or parallel circuit relation with the generator. The switching means comprises a series switch S and parallel switches P1 and P2 shown diagrammatically. These switches may be of the manually operable type or power operated remotely controlled type as desired.

Power plant power output regulating means are provided comprising an engine driven governor GOV of any well known type which acts in response to variations in engine speed and load for adjusting the conventional engine fuel regulating means, not shown, and for also adjusting a generator field rheostat FR to cause the power plant to operate at constant speed load and output in a well-known manner. The governor is also provided with any well known type of electrically controlled power operated governor speed setting means shown generally at EP whereby the speed response to the governor GOV may be varied to cause operation of the engine and generator power plant at any one of a plurality of constant values of speed, load and output in order to vary the speed and torque of the traction motors.

The generator excitation system includes a series field winding SE connected in series between the generator armature and motors in conventional manner and also shunt and separately excited excitation circuits.

The shunt excitation circuit includes a shunt field winding SH and a discharge resistor SHR.

The separately excited excitation circuit includes the above mentioned field rheostat FR, a field winding BF and a discharge resistor BFR. The electrical connections between the various elements of the shunt and separately excited excitation circuits will be described later in describing the control means which controls the excitation current in these circuits.

The control means for the engine generator power plant output regulating means comprises a manually operable master controller MC and electro-responsive control means which comprises the relays WSR1 and WSR2, each of which acts only in response to slight differences in speed between a pair of parallel connected traction motors to cause a sudden reduction in the excitation and output of the generator in order to check overspeeding of any traction motor.

The master controller MC is of conventional type and is provided with stationary contacts and movable contacts, not shown. The movable contacts are movable into electrical contact with the stationary contacts to control energization of the electromagnetically actuated governor speed setting means and excitation of generator excitation control contactors SHC and BFC for causing normal operation of the engine generator power plant at any one of a plurality of constant values of speed, load and output in a well known manner. The electro-responsive relays WSR1 and WSR2 control deenergization of the contactors SHC and BFC independently of the master controller to cause a sudden reduction in the generator excitation and output to the traction motors in order to check instantly overspeeding of any motor and slippage of the wheels driven thereby.

The control connections between the various control devices are shown in lighter lines in the drawing. The master controller MC is connected with the positive terminal of a battery BAT through a manually operable control switch CS and conductors 1, 3, 5, and 7 and train line conductors, not shown, which are included in a train line shown extending to the electromagnetically actuated governor speed setting means EP. A negative train line conductor NEG is shown extending from the train line and is connected to the negative battery terminal and another train line conductor 9 is shown extending from the train and connected to one of the normally open lower fixed contacts of the contactor SHC. Train line conductors connected in parallel with those mentioned are provided for connection with similar control devices and master controllers on other locomotives units for control and operation in multiple in a conventional manner. One terminal of a limiting resistor r is also connected to the train line conductor 9 and the other terminal of this resistor is connected by a conductor 11 to a conductor 13, which interconnects one terminal of the actuating winding of the contactor SHC and one of the normally open pairs of fixed contacts of the relay WSR1. The other fixed contact of the relay WSR1 is connected by a conductor 15 to the other winding terminal of the contactor SHC. A branch conductor 14 is connected between the conductor 13 and one of the normally open fixed pair of contacts of the relay WSR2 and the other fixed contact of this relay is connected by a branch conductor 16 to the conductor 15, which is connected by a conductor 17 to the negative train line conductor NEG. It is apparent that the normally open fixed contacts of the relays WSR1 and WSR2 are connected directly across the winding of the contactor SHC by the conductors 13, 14, 15 and 16 and therefore closure of the normally open fixed contacts of either or both relays by their armatures upon energization of their windings will cause the winding of the contactor SHC to be shunted and its armature fall to the normal position as shown where both pairs of fixed contacts are opened. One terminal of the winding of the relay WSR1 is connected by a conductor 19 with the power conductor shown interconnecting the series field winding of the motor M2 with the armature of this motor. The other terminal of the winding of the relay WSR1 is connected by a conductor 21 to the power conductor shown interconnecting the series field winding of the motor M3 with the armature of this motor. The winding of the relay WSR1 is accordingly connected directly between the motors M2 and M3 which are permanently connected in parallel power circuit relation. The winding of the relay WSR2 is connected directly between the motors M1 and M4 which are also permanently connected in parallel power circuit relation. One winding terminal of the relay WSR2 is connected by a conductor 23 to the power conductor interconnecting the series field winding of the motor M1 with the armature of this motor and the other winding terminal of the relay WSR2 is connected by a conductor 25 to the power conductor interconnecting the series field winding of the motor M4 with the armature of this motor.

As each of the relay windings are connected directly between the motors of pairs of parallel connected motors which are therefore supplied with equal values of voltage to cause them to operate at equal speeds and thereby inhibit wheel slippage, no current will normally flow through the relay windings unless there is a slight overspeeding of one motor of a pair due to a slight slippage of the wheels driven thereby which then causes an increase in the C. E. M. F. in the motor which overspeeds to cause energization of the relay winding, connected between the motors of this pair, and closure of the relay contacts.

The normally open upper pair of fixed contacts of the contactor SHC are shown connected in shunt relation with the discharge resistor SHR which is connected in series with the generator shunt field winding SH and this field winding and discharge resistor are connected in shunt relation with the armature of the generator G. The normally open upper pair of fixed contacts of the contactor SHC are control contacts and will be referred to later, as these contacts are provided to control energization and deenergization of the contactor BFC, which controls energization and deenergization of the generator separately excited excitation circuit.

One terminal of the winding of the contactor BFC is connected by a conductor 26 to one of the upper fixed control contacts of the contactor SHC, the other fixed control contact of which is connected to the conductor 9, and the other winding terminal of the contactor BFC is connected by a conductor 27 to the conductor 15. The lower fixed contacts of the contactor BFC, which are normally bridged by the armature contact, are connected in series with the discharge resistor BFR, the generator separately excited field winding BF and the field rheostat FR by means of the conductors 3, 5, 7, 29, 31 and 33. The normally open upper pair of fixed contacts of the contactor BFC are connected between the conductors 27 and 31 by conductors 28 and 32 respectively.

With the various control devices in their normal position, as shown in Figure 2, the operation thereof is as follows:

Closure of the control switch CS connects the positive terminal of the battery BAT to the master controller MC through the conductors 1, 5, and 7. When the controller is moved to one control position, energization of the electromagnetically actuated governor speed setting means EP through certain of the train line conductors takes place to cause operation of the engine and generator at idling speed and minimum load and output. Closure of the series or parallel switches S, or P1 and P2 connects the parallel connected pairs of motors in either series or parallel power circuit relation with the generator. Movement of the controller to other control positions causes energization of the electromagnetic means EP through certain train line conductors and also causes energization of the conductor SHC through the train line conductor 9 to cause operation of the engine generator power plant at values of speed load and output above idling speed so that power will then be supplied to the motors M1, M2, M3 and M4 to cause starting of the locomotive.

Upon energization of the winding of the contactor SHC through train line conductor 9, resistor r and conductors 11, 13, 15, 17 and negative train line conductor NEG both pairs of fixed contacts of the contactor SHC will be bridged or closed by the armature contacts by action of the winding thereon. Closure of the lower pair of fixed contacts shunts the discharge resistor SHR to cause normal excitation of the shunt field winding SH of the generator. Closure of the upper pair of control contacts of the contactor SHC causes energization of the winding of the contactor BFC through conductors 9, 26, 27, 15, 17 and negative train line conductor NEG which causes the armature contact thereof to move out of bridging relation with the lower pair of fixed contacts, opening these contacts, and to bridge or close the upper pair of fixed contacts. When the lower pair of fixed contacts of the contactor BFC are opened the discharge resistor BFR is disconnected from the normally closed series connected circuit including the discharge resistor BFR, the separately excited field winding BF, the rheostat FR and circuit conductors 3, 5, 7, 29, 31, and 33, and closure of the upper contacts causes the field winding BF and field rheostat FR to be connected in series with the battery BAT and energized through the conductors 1, 3, 5, 7, 29, 28, 32, 31, and 33 which causes excitation of the separately excited field winding and a further increase in the generator output, depending upon the adjustment of the field rheostat FR by the engine governor GOV. The increase in output resulting from the increase in excitation current in the generator shunt and separately excited excitation circuits causes a corresponding increase in the current and power supplied to the generator series excitation winding SE and traction motors M1, M2, M3, and M4 and the motors accordingly exert driving torque on the respective wheeled axles to start the locomotive.

As previously explained in detail, pairs of motors driving wheeled axles located equi-distant on opposite sides of the locomotive center of gravity are permanently connected in parallel to inhibit slippage of the wheels on which the load is reduced upon starting of the locomotive. It has also been explained in detail how the respective windings of the relays WSR1 and WSR2 are connected between the motors of each parallel connected pair of motors for energization only upon slight overspeeding of a motor of a pair due to slippage of the wheels driven thereby. It will therefore be apparent that should the wheels driven by one motor of a pair of parallel connected pair of motors slip slightly, the speed and C. E. M. F. of this motor will increase and cause energization of the winding of the relay connected between this pair of motors which will cause closure of the fixed relay contacts. When these contacts are closed the winding of the contactor SHC will be automatically shunted and the armature contacts of this contactor will open both pairs of fixed contacts thereof. Opening of the lower pair of fixed contacts inserts the discharge resistor SHR in series with generator shunt field winding SH which causes sudden decrease in excitation current therein and a corresponding decrease in the generator output to the motors. Opening of the upper pair of control contacts of the contactor SHC causes deenergization of the winding of the contactor BFC which causes its armature to open the upper pair of fixed contacts and close the lower fixed contacts. The opening of the upper contacts of the contactor BFC disconnects the separately excited field winding BF from the battery BAT and the closing of the lower fixed contacts thereof connects the field winding BF and rheostat FR in series with the discharge resistor BFR which causes a sudden collapse in the excitation in this field winding and a further and drastic reduction in the generator output to the motors. This sudden and drastic reduction in the generator excitation and output to the motors instantly checks any slight overspeeding of any motor and slippage of any wheel driven thereby. When wheel slippage is checked, the windings of both relays WSR1 and WSR2 are deenergized, the contactors SHC and BFC are reenergized to cause an increase in the power supplied to the motors to the original value and thereby cause the motors to again exert driving torque to the locomotive wheels.

It will be evident from the above that means are provided for electrically connecting in parallel the motors driving wheeled axles spaced equidistant on opposite sides of the center of gravity of the lomocotive in order to inhibit slippage of the locomotive wheels and that means are provided which act automatically instantly to check any slight slippage of any wheel should it occur, and to restore the motor driving torque when this slippage is checked.

It has been found that the above described locomotive drive and control system effectively inhibits wheel slippage and checks slippage of any wheel before it has slipped one revolution, under normal operating conditions.

It has been found that the above described traction motor grouping arrangement effectively inhibits slippage of adjacent truck wheels when on a slippery spot on the rails.

I claim:

1. A generating electric locomotive comprising a plurality of groups of axle driving motors, the motors of each group being located symmetrically with respect to the center of gravity of the locomotive, independent parallel circuits for connecting each group of motors in parallel to inhibit overspeeding of any motor of a group due to change in axle loading, an electric generator for supplying power to said motors, means for connecting each parallel connected group of motors in series or parallel driving circuit relation with said generator, generator output regulating means, a prime mover for driving said generator and means acting only in response to slight differences in speed between the motors of each group for controlling said generator output regulating means to equalize the speed of all said motors.

2. A generating electric locomotive comprising a plurality of identical multi-axle supporting trucks, said trucks and axles being spaced symmetrically with respect to the center of gravity of the locomotive, a motor for driving each axle, independent parallel circuits for connecting in parallel the motors driving the axles of different trucks spaced symmetrically with respect to the center of gravity of the locomotive to inhibit overspeeding of any motor due to a change in axle loading, an electric generator supplying power to said motors, means for connecting said independent parallel motor circuits in series or parallel driving circuit relation with said generator, output regulating means for said generator, a prime mover for driving said generator, and control means acting automatically in response to any slight overspeeding of any motor of any group of parallel connected motors for controlling said generator output regulating means to instantly check overspeeding of any motor and slippage of the wheels driven thereby.

3. A locomotive comprising a plurality of pairs of wheeled axles, the axles of each pair being spaced substantially equi-distant from and on opposite sides of the center of gravity of the locomotive in order to support equal values of static loads, a motor for driving each axle, independent parallel circuit connections interconnecting each pair of motors driving each pair of axles in parallel, a generating electric power plant for supplying power to said motors, means for connecting said independent parallel circuit connections in series or parallel driving circuit relation with said power plant, means for suddenly reducing the power supplied to the motors from the power plant, and electro-responsive means connected between the motors of each pair of said parallel connected motors to act only in response to slight differences in speed between the motors for controlling said power reducing means in order instantly to check overspeeding of any motor and slippage of any wheel driven thereby.

4. A locomotive comprising a plurality of wheeled driving axles, pairs of said axles being spaced symmetrically with respect to the center of gravity of the locomotive, a traction motor for driving each axle, independent parallel circuits for connecting in parallel each pair of motors driving each pair of axles spaced symmetrically with respect to the center of gravity of the locomotive a generating electric power plant for supplying power to the motors, switching means for connecting said independent parallel circuits in series or parallel circuit relation with said power plant, means for varying the output of the power plant, manually operable means for controlling the output varying means, and electrical control means, connected between the motors of each pair of parallel connected motors in order to act in response to slight differences in speed therebetween, for controlling said output varying means independently of said manual control means in order to check instantaneously overspeeding of any motor.

5. A locomotive comprising a plurality of wheeled driving axles spaced symmetrically with respect to the center of gravity of the locomotive, a traction motor for driving each axle, a prime mover generator power plant for supplying power to said motors, output regulating means for said power plant, independent parallel circuits for connecting in parallel, the motors driving each pair of axles spaced symmetrically with respect to the center of gravity of said locomotive, switching means for connecting said independent parallel circuits in series or parallel with said generator, means acting only in response to variations in counterelectromotive force between the motors of each parallel connected pair for controlling said output regulating means to check overspeeding of any motor of a pair, a master controller, control connections between said controller and said output regulating means, and multiple train line connections interconnected with said control connections adapted to be connected to similar output regulating means and controllers for multiple control and operation by any controller.

6. A locomotive comprising a plurality of pairs of wheeled driving axles, a driving motor for each axle, the individual wheeled axles of each pair being located on opposite sides of the center of gravity of the locomotive, separate means for electrically connecting the motors driving each pair of axles in parallel, a power plant for said motors, output varying means for said power plant, connection transferring means for causing each pair of parallel connected motors to be connected in series or parallel power circuit relation with said power plant, and electrical control means for said power plant output regulating means connected across each pair of parallel connected motors, said electrical control means adapted to act instantly upon a slight difference in speed between the motors of each pair to vary the power plant output so that incipient slippage of any driving wheel is checked instantly.

TORSTEN O. LILLQUIST.